United States Patent

Parker et al.

[11] 3,948,327
[45] Apr. 6, 1976

[54] WINGFOLD CONFIGURATION

[75] Inventors: Jimmy Jay Parker, Des Moines; Darrel Lee Honnold, Winterset, both of Iowa

[73] Assignee: Deere & Company, Moline, Ill.

[22] Filed: June 26, 1974

[21] Appl. No.: 483,098

[52] U.S. Cl. .............................. 172/311; 280/411 R
[51] Int. Cl.² .................. A01B 19/04; A01B 73/00
[58] Field of Search ...... 172/311, 316, 456; 16/163, 16/166; 239/168; 280/411 R, 412, 413

[56] References Cited
UNITED STATES PATENTS

| | | | |
|---|---|---|---|
| 3,321,028 | 5/1967 | Groenke | 172/311 |
| 3,643,742 | 2/1972 | Wellendorf | 172/316 |
| 3,669,195 | 6/1972 | Green et al. | 172/311 |
| 3,692,121 | 9/1972 | Kenney | 172/456 |
| 3,797,580 | 3/1974 | Roth | 172/311 |
| 3,811,516 | 5/1974 | Thompson et al. | 172/311 |
| 3,844,358 | 10/1974 | Shuler et al. | 172/311 |

OTHER PUBLICATIONS

German Advertising Literature — "Praziosa" — Das Bessere ist des Guten Feind, 1971.

Primary Examiner—Edgar S. Burr
Assistant Examiner—Paul T. Sewell

[57] ABSTRACT

A multiple sectioned agricultural implement having hydraulically powered folding means. A fixed center section and each side having inner wing sections and outer wing sections, each set respectively indentical in structure. Hydraulically powered folding cylinders fold the outer wings over and alongside the inner wings. A hydraulically powered lift cylinder means plumbed in parallel with the fold cylinders lifts the inner wing sections and their respective folded outer wing section to a vertical position. A cross brace member stabilizes the raised wing sections during transport and storage.

8 Claims, 7 Drawing Figures

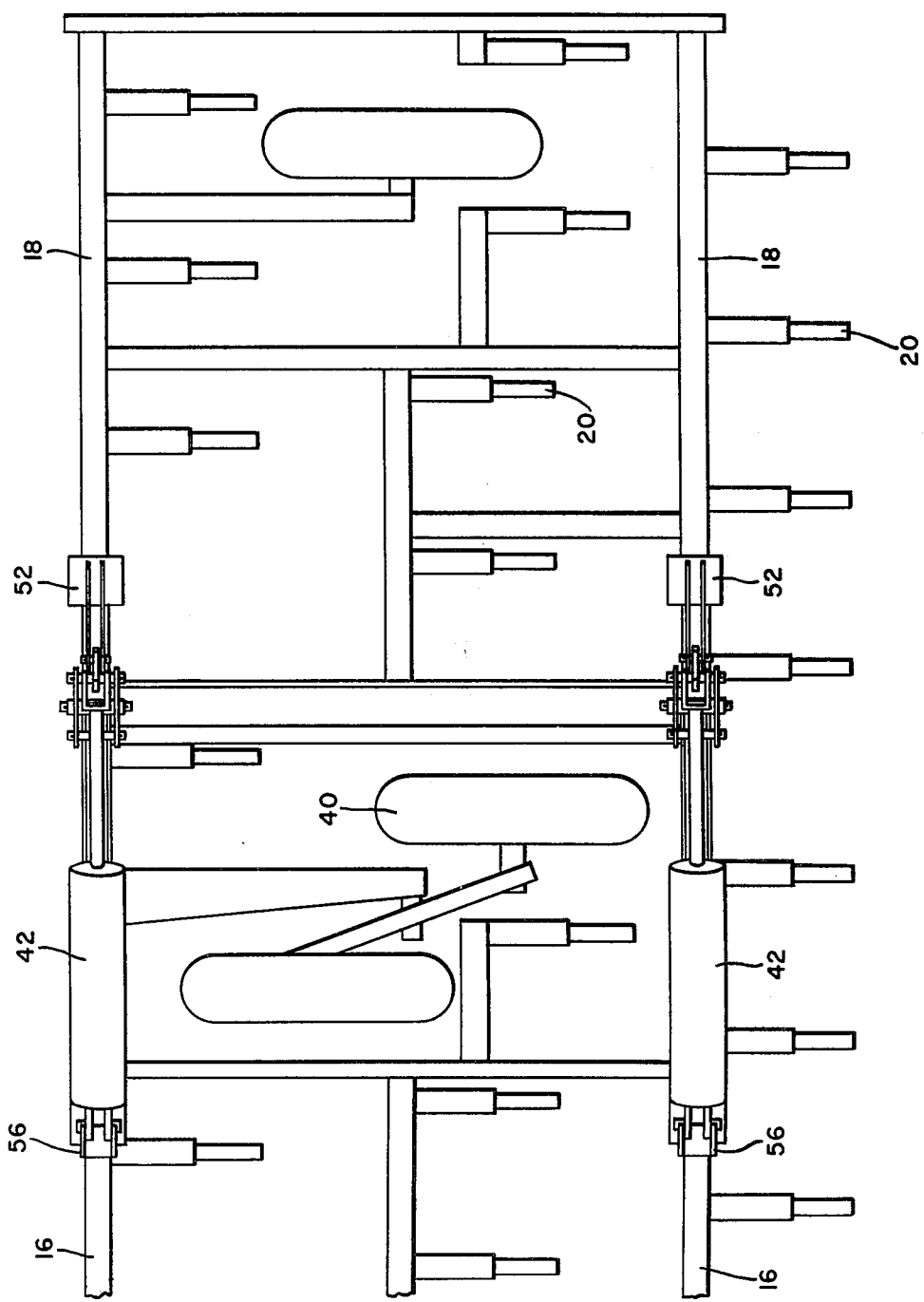

WINGFOLD CONFIGURATION

BACKGROUND OF THE INVENTION

This invention relates generally to farm implements of the groundworking or cultivating type having a plurality of sections connected together to form a wide transverse structure and more particularly to the type having a main central section and adjacent side sections spaced in a side-by-side relationship and pivotally connected to the center section to be folded thereabout.

Multiple sectioned farm implements of the type having foldable sections that reduce overall implement width are known in the art. Side sections have been folded behind, in front of, and over fixed center sections. Those implements having side sections which fold behind or in front of the center section require long storage areas. Those implements having side sections which fold over the center section and into a box configuration are limited to a width equal to the perimeter of the box. Those implements which fold upwardly about the fixed center section with the outer wings hanging outwardly are limited as to minimum storage width since the tools mounted on the frame project outwardly.

SUMMARY OF THE INVENTION

The principle object of the present invention is to provide a wingfold configuration having a center section, two inner wing sections and two outer wing sections wherein the multiple wing sections fold inwardly to form a narrow and compact unit convenient to transport and requiring only a minimum of storage space. It is further an object to provide a hydraulic folding means which will fold the outer wings upwardly and inwardly through an arc of approximately 180° and lift the inner wings with the folded outer wings upwardly through an arc of approximately 90° to minimize transport width, storage and lateral projection of the mounted tools. Another object of the present invention is to provide a multiple sectioned agricultural implement with a low height profile that is compact during transport and storage.

BRIEF DESCRIPTION OF THE DRAWINGS

FIG. 2 is a top elevation view of the folding means.

DESCRIPTION OF THE PREFERRED EMBODIMENT

Figure 1:
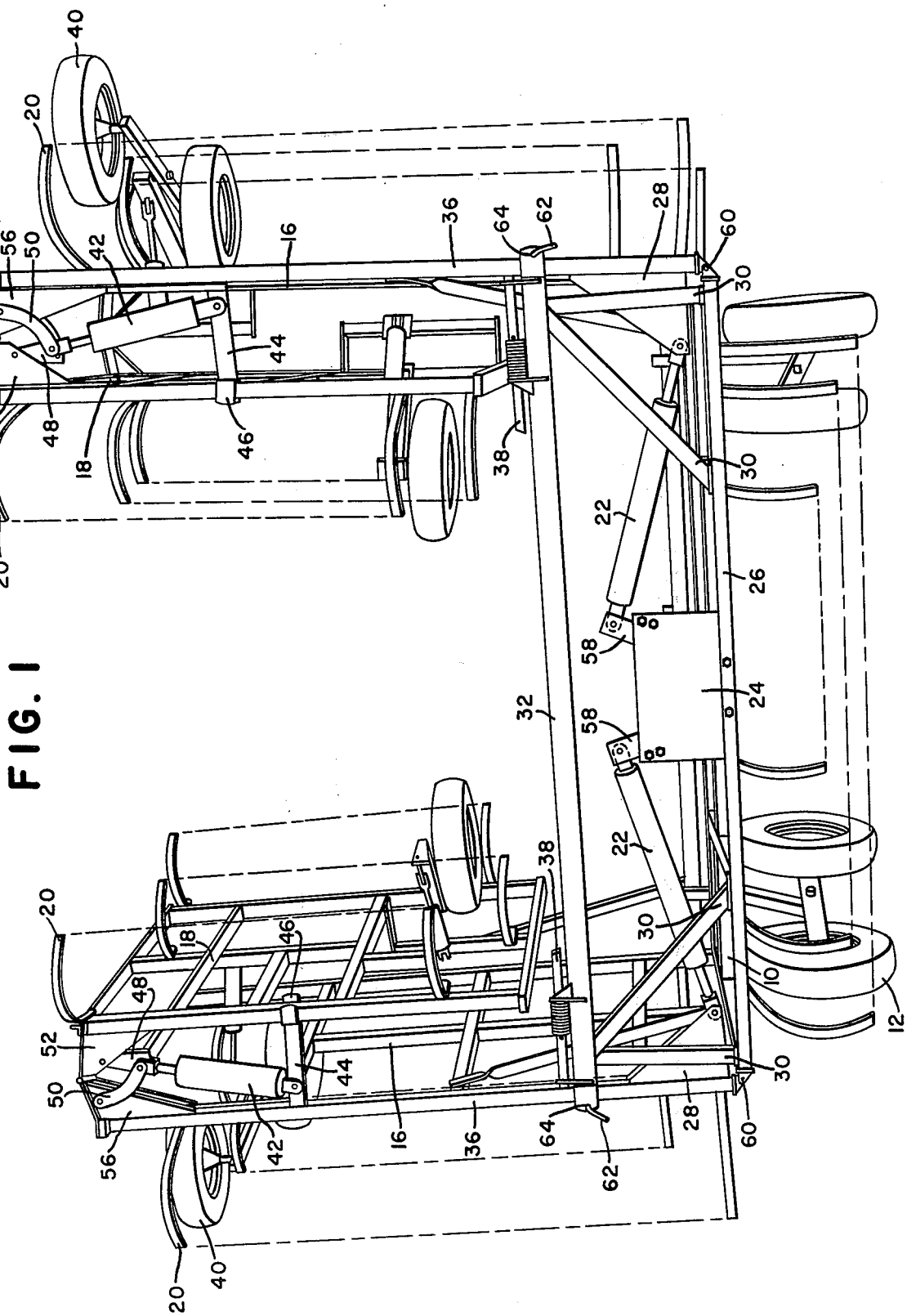
FIG. 1 is a rear elevational view of the improved farm implement in a folded configuration.

The invention is illustrated in FIG. 1 on a springtooth harrow, but can effectively be utilized on other groundworking implements such as cultivators or planters.

The invention as illustrated includes an elongated transverse center section means 10 carried on two pairs of ground wheels 12 and having a forwardly extending draft tongue for connection to any suitable source of propelling power, such as a tractor (not shown).

Pivotally mounted to each side of the center section 10 are inner wing sections 16 and pivotally mounted to the outer sides of each inner wing section is an outer wing section 18. Each set of wing sections is essentially identical in structure. Each section also carries depending groundworking tools 20.

Figure 6:
FIG. 6 is a top elevational perspective of the transverse U-shaped opening.
Figure 7:
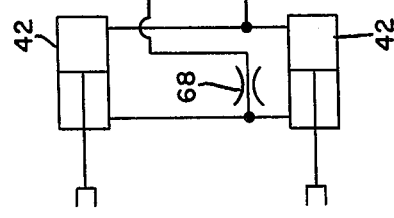
FIG. 7 is a side view of the transverse brace U-shaped member.

The base end of at least one hydraulic lift cylinder 22 is pivotally secured to a section bracket 24 mounted on a rear cross member 26 of the center section 10. The rod end of each hydraulic lift cylinder is pivotally attached to an adjacent inner wing section bracket 28. At each end of the rearwardmost center section cross member 26 are two vertically positioned brace mounts 30. These brace mounts are secured to a transversely extending brace 32. The brace 32 has at each end a U-shaped opening 34, FIG. 6, wherein a cross bar 36 of the respective inner wing section 16 will rest when raised. Horizontally mounted on the top of each end of the transversely extending brace 32 and extending beyond the end of the brace are slidable spring-loaded or biased bars 38.

Figure 3:
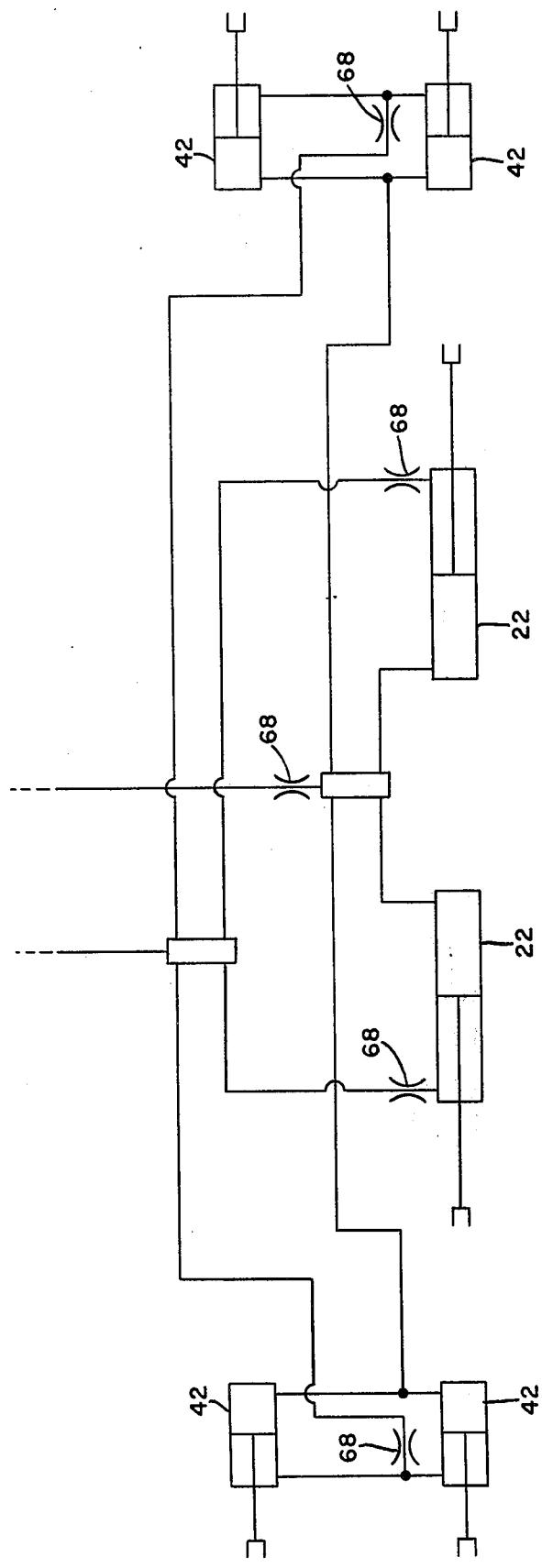
FIG. 3 is a schematic fluid flow diagram of the hydraulic system utilized in the apparatus of the invention.
Figure 4:
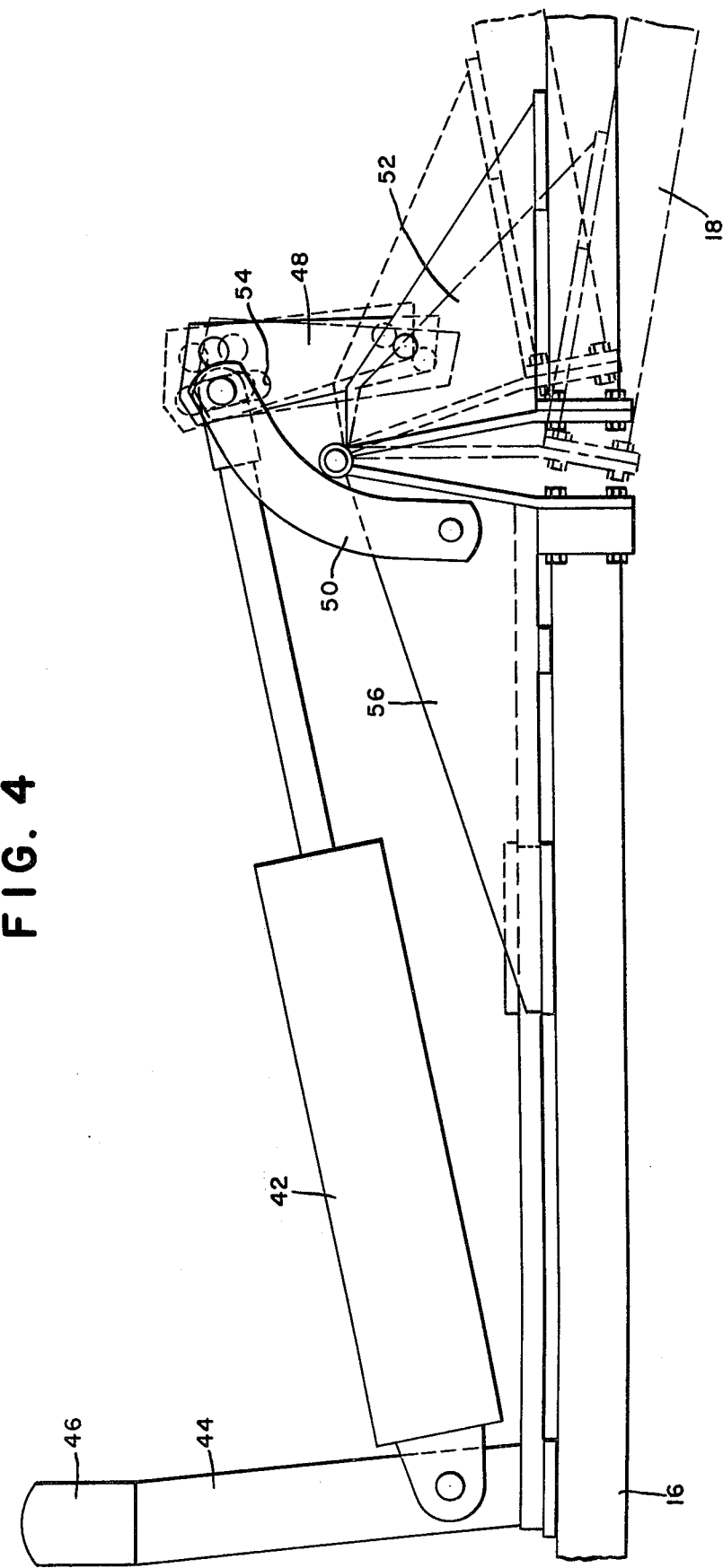
FIG. 4 is a perspective of the folding mechanism capable of limited flexible movement in both vertical directions.
Figure 5:
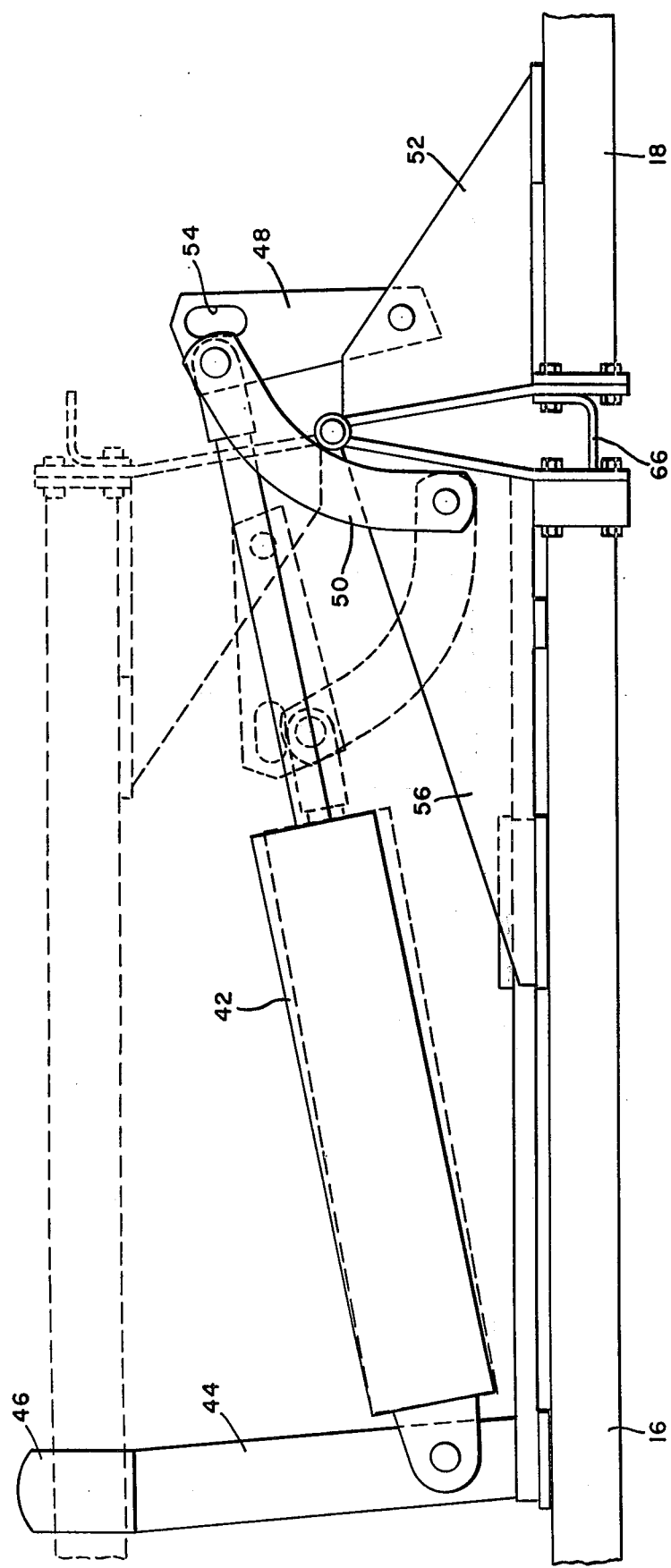
FIG. 5 is a perspective of the folding mechanism in a rigid non-flexing position.

Transverse inner wing sections 16 pivotally joined to the center section are carried on a pair of ground wheels 40. The base end of each hydraulic folding cylinder 42 is pivotally secured to an inner wing brace 44 which is fastened to each inner wing. The fold cylinders 42 are hydraulically connected in parallel with the lift cylinder 22, see FIG. 3. The brace 44 extends perpendicular to the inner wing section and has a U-shaped upper end 46 wherein the folded outer wing 18 can rest. Pivotally attached to the rod end of each folding hydraulic cylinder 42 is a first and a second linkage means 48, 50. The first link 48 is of a triangular shape with its base end pivotally attached to the outer wing bracket 52. A second opening 54 of elongated shape in the free end of the first link is alternately attached to the cylinder rod end to provide a lost motion connection between the inner and outer wing sections whenever a flexible outer wing section connection is required, see FIG. 4. The second link 50 is of arcuate shape with the base end pivotally attached to the inner wing outer bracket 56. An outer wing connection flexible in the upwardly direction, but rigid and incapable of downwardly flex can be provided by securing the detachable bracket 66 to the outer wing inner portion.

The operation of the wingfold mechanism is as follows: when the implement is in its normal operating configuration, all wings will be extended. To fold the outer wing sections 18, the operator manually moves a control lever which will activate the operating cycle of the in-parallel hydraulic system. Thereafter hydraulic fluid under pressure from the hydraulic pump is directed to the rod end of each of said parallel connected cylinders 22, 42, causing the folding cylinders 42 to retract before the lift cylinders 22 since the load opposing the folding cylinder 42 rod ends is less than that opposing the lift cylinders 22. Retraction of the folding cylinders 42 will cause the outer wing sections 18 to pivot upwardly and inwardly through an arc of approximately 180° and come to rest above, parallel to the inner wing 16 and abutting against the inner wing brace 44. When the outer wings 18 are completely folded, the operating pressure in the hydraulic system causes the lift cylinders 22 to retract and acting through the wing bracket 28, raise the inner wing sections 16 and their respective folded outer wing sections 18. As the inner wing sections 16 rotate through the final few degrees, the center of gravity of the raised wing structure comprised of the folded outer wing sections 18 and inner wing sections 16 comes to rest inwardly of the inner wing pivotal axis 60. As the inner wing section 16 comes to rest in the U-shaped portion 34 of the cross brace, the inner wing section contacts and depresses its respective spring-loaded rod 38. A pin 62 is then inserted into the openings 64 of the U-shaped nest 34 to lock the inner wing 16 in its vertical position. The spring-loaded rod 38 exerts a constant outward pressure on the vertical inner wings 16 to minimize the inner wing movement during transport.

To unfold the implement requires a reversed procedure. The pins 62 are removed from the openings 64 in the U-shaped brace 32, and the spring-loaded rods 38 force the inner wings 16 outwardly so that the center of gravity of the folded wing structure is outwardly of the wing pivotal axis. Suitable restrictor valves 68 are provided in the line from the cylinders 22 and 42 so as to prevent instantaneous gravitation of the inner and outer wing sections as they each respectively descend. After the inner wings 16 have been lowered to the ground, hydraulic fluid under pressure from the pump is directed to the anchor end of each fold cylinder 42 causing its respective rod to extend in the outer wings 18 to pivotally unfold through an arc of approximately 180°.

We claim:

1. A foldable multiple sectioned farm implement comprising: a horizontally disposed section having ground wheels and depending groundworking tools; a plurality of transversely extending and horizontally aligned inner wing sections pivotally connected and positioned on opposite sides of said center section, said wing sections having depending groundworking tools; horizontally disposed outer wing sections having depending groundworking tools; pivot means pivotally connecting the outer wing sections at their inner wing extremities to the outer extremities of the inner wing sections about an axis at a level above the respective sections to permit the outer wing sections to swing to a horizontal position above the inner wing sections; a hydraulically powered folding means acting between each outer wing section and its respective adjacent inner wing section to fold and unfold the outer wing section between an extended position with respect to the inner wing and a folded horizontal position above and alongside the inner wing and in which the groundworking tools project upwardly from the respective outer wing sections, said hydraulically powered folding means comprising a pair of vertically disposed links pivotally connected at their lower ends, to the inner and outer wing sections respectively adjacent, but below the pivot means and pivotally interconnected at their upper ends above said pivot means, and an hydraulic cylinder positioned above the inner wing section and at one end to the inner wing section inboard of said links and extending transversely outwardly therefrom to an outer end connected to at least one of the links; and a hydraulically powered lifting means acting between the fixed center section and the adjacent inner wing section to rotate the inner wing and outer wing section when the latter is in its folded position between horizontal and vertical positions and when in said latter position the groundworking tools on the inner wing section project horizontally outwardly and the groundworking tools on the outer wing sections project inwardly.

2. The invention defined in claim 1 wherein the hydraulically powered lifting means is at least one extensible and retractable hydraulic cylinder secured to a bracket on the center section and a bracket on an inner wing and when retracted, causes the side sections adjacent to the center section to raise to a perpendicular position with respect to the center section.

3. The invention defined in claim 1 in which the hydraulically powered folding and lifting means are comprised of hydraulic fold and lift cylinders respectively in parallel, and wherein the hydraulic lines in communication with their respective cylinders have suitable restrictors to restrict the escape of hydraulic fluid from their respective cylinders as each cylinder's respective wing section descends.

4. The invention defined in claim 1 in which the lifting means is further characterized as having a transverse brace positioned above and substantially abridging the transverse expanse and secured to the center section, said brace having opposite end portions securable to the raised inner wing sections.

5. The invention defined in claim 4 in which each outer portion of the tranverse brace has an opening for receiving a member of the respective inner wing sections when it is in its raised position and is characterized by a removable locking pin for securing the inner wing to said brace members.

6. In a foldable multiple sectioned farm implement with a center section having ground wheels; a plurality of transversely extending inner wing sections pivotally connected to and positioned on opposite sides of said center section; outer wing sections; means pivotally connecting the outer wing sections at their inner extremities to the outer extremities of the inner wing sections; a hydraulically powered folding means acting between each outer section frame and its respective adjacent inner wing section to fold and unfold the outer wing section between an extended position with respect to the inner wing and a folded position substantially above and alongside the inner wing section, and folding means comprising: an inner wing outer bracket secured to an outer portion of said inner wing, an outer wing bracket secured to an inner portion of each outer wing, a pair of links, one being pivotally connected to the inner wing outer bracket and the outer being pivotally connected to the wing bracket, with one link having one opening therein and the other link having two openings therein selectively alignable with said one opening, and with one of said two openings being larger than said one opening, a pin carried in said one opening and selectively in one of the aforesaid pair of openings for selectively and pivotally interconnecting the links in either a lost or nonlost motion position, said folding means further including an extensible and retractable inner wing hydraulic motor extending between the inner wing and at least one of the links; and a hydraulically powered lifting means acting between the fixed center section and the adjacent inner wing section to rotate the inner wing section between horizontal and vertical positions.

7. The invention defined in claim 6 in which the hydraulic folding means folds the outer wing sections through an arc of approximately 180°, and when folded rests generally parallel to the adjacent inner wing section.

8. The invention defined in claim 6 further characterized by each inner wing section having a rigid upwardly projecting wing brace and in which the outer wing section when folded over its adjacent inner wing section rests upon the brace in a substantially horizontal disposition.

* * * * *

UNITED STATES PATENT OFFICE
CERTIFICATE OF CORRECTION

Patent No. 3,948,327            Dated 6 April 1976

Inventor(s) Jimmy Jay Parker et al

It is certified that error appears in the above-identified patent and that said Letters Patent are hereby corrected as shown below:

Column 4, line 49, change "outer" second occurrence to -- other --.

Signed and Sealed this

Sixteenth Day of November 1976

[SEAL]

Attest:

RUTH C. MASON
*Attesting Officer*

C. MARSHALL DANN
*Commissioner of Patents and Trademarks*